(12) United States Patent
Ogawa et al.

(10) Patent No.: US 8,013,875 B2
(45) Date of Patent: Sep. 6, 2011

(54) COLOR SIGNAL ADJUSTMENT MODULE IN IMAGE DISPLAY APPARATUS

(75) Inventors: Kiyotaka Ogawa, Kawasaki (JP); Hisashi Sugahara, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 796 days.

(21) Appl. No.: 11/505,481

(22) Filed: Aug. 17, 2006

(65) Prior Publication Data

US 2007/0223017 A1 Sep. 27, 2007

(30) Foreign Application Priority Data

Mar. 23, 2006 (JP) .................................. 2006-081692

(51) Int. Cl.
*G09G 5/10* (2006.01)
(52) U.S. Cl. .......... 345/690; 345/589; 345/600; 345/88; 345/204; 382/167
(58) Field of Classification Search .................. 345/601, 345/602, 603, 604, 605, 690, 98, 589, 597, 345/549, 600, 88, 204; 358/518, 519–521; 382/167
See application file for complete search history.

(56) References Cited

U.S. PATENT DOCUMENTS

| 5,872,556 | A | 2/1999 | Rackley et al. | |
|---|---|---|---|---|
| 6,756,991 | B2 * | 6/2004 | Koyama | ........................ 345/602 |
| 6,870,552 | B2 * | 3/2005 | Koyama | ........................ 345/690 |
| 6,950,110 | B2 * | 9/2005 | Falk | ............................... 345/589 |
| 2002/0054314 | A1 | 5/2002 | Takahashi | |
| 2002/0105528 | A1 | 8/2002 | Koyama | |
| 2002/0180677 | A1 | 12/2002 | Koyama | |
| 2005/0111046 | A1 * | 5/2005 | Kurumisawa et al. | ........ 358/3.06 |
| 2007/0263729 | A1 * | 11/2007 | Ju et al. | .................... 375/240.24 |

FOREIGN PATENT DOCUMENTS

| CN | 1383542 | A | 12/2002 |
|---|---|---|---|
| CN | 1612615 | A | 5/2005 |
| JP | 05176339 | * | 7/1993 |
| JP | 6-348829 | | 12/1994 |
| JP | 2001-343794 | A | 12/2001 |
| JP | 2001-356754 | | 12/2001 |
| JP | 2002-152545 | | 5/2002 |
| JP | 2002-351448 | A | 12/2002 |
| JP | 2004-038693 | | 2/2004 |
| JP | 2005-70764 | A | 3/2005 |
| JP | 2005-135157 | A | 5/2005 |
| JP | 2005-266576 | A | 9/2005 |

* cited by examiner

*Primary Examiner* — Lun-Yi Lao
*Assistant Examiner* — Kelly Hegarty
(74) *Attorney, Agent, or Firm* — Arent Fox LLP

(57) ABSTRACT

Storage areas for storing four types of correction data tables for each color, which are configured by data to which gradation level data of a color is corrected, are provided as RAM1 to RAM4. A first selector selects three types of correction data tables, from which correction data for gradation level data of each of three primary colors of a color image is to be obtained, from among the correction data tables stored in the RAM1 to the RAM4. A second selector obtains correction data for gradation level data of each of the three primary colors from the correction data tables selected by the first selector. A CPU makes a RAM other than RAMs storing the correction data tables selected by the first selector among the RAM1 to the RAM4 store a correction data table, which is configured by data to which the correction data is changed.

3 Claims, 11 Drawing Sheets

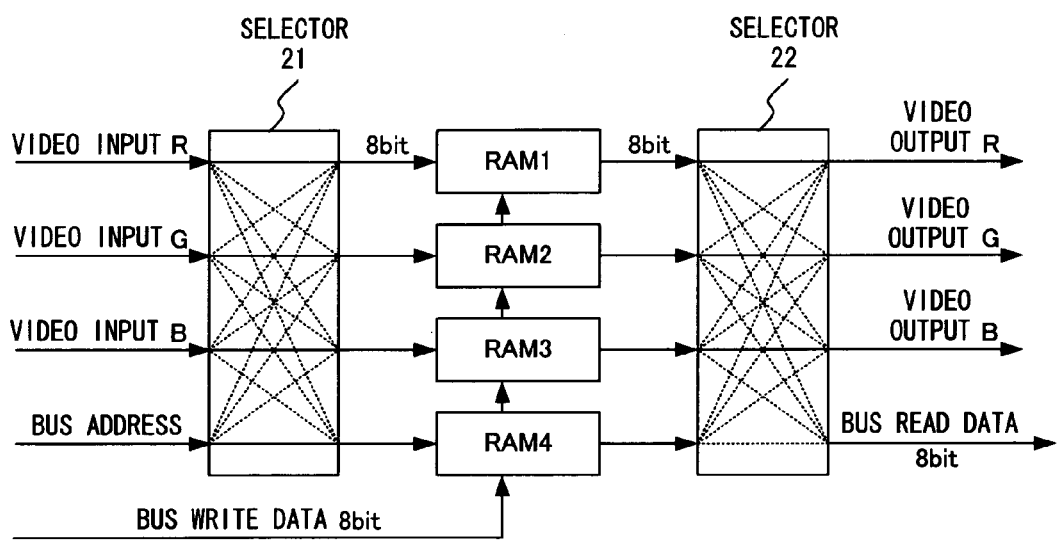
F I G. 4

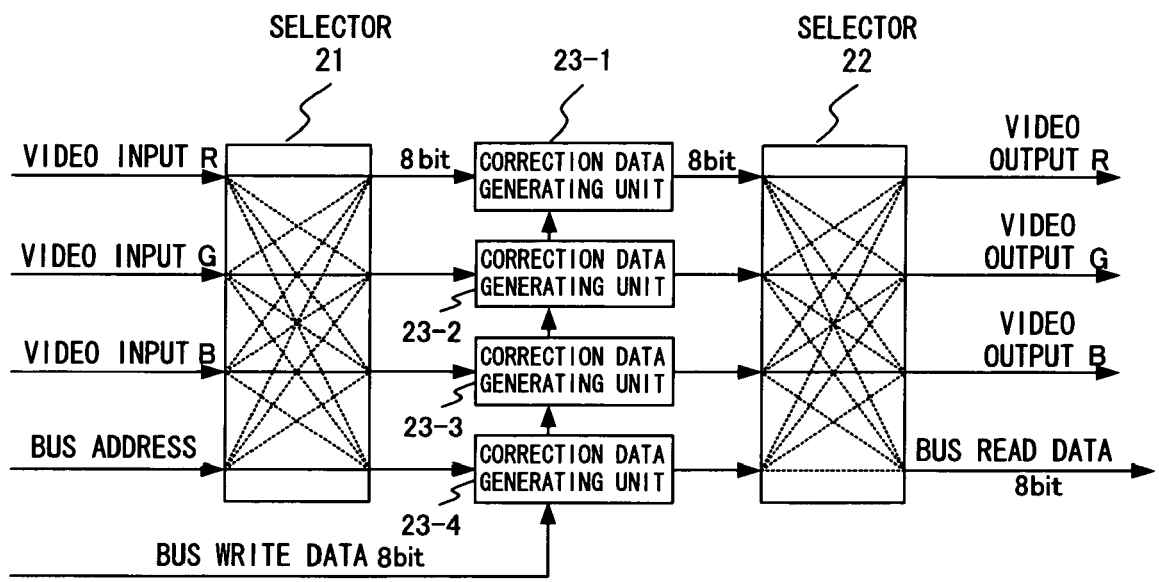
F I G. 5

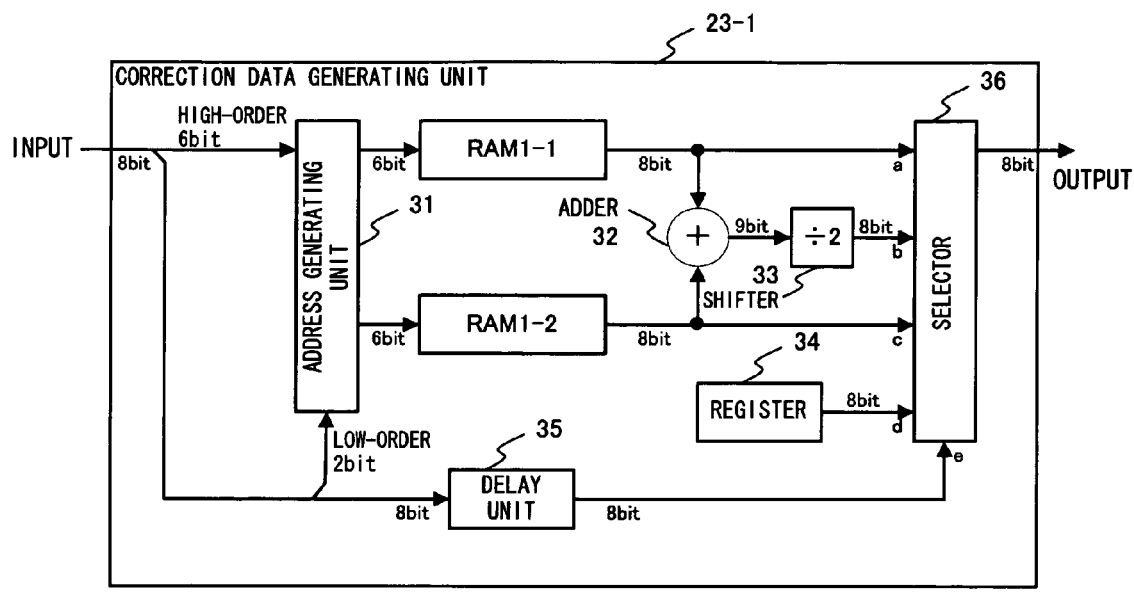
F I G. 7

| INPUT(8bit) | 0 | 1 | 2 | 3 | 4 | 5 | 6 | 7 | 8 | ... | 248 | 249 | 250 | 251 | 252 | 253 | 254 | 255 |
|---|---|---|---|---|---|---|---|---|---|---|---|---|---|---|---|---|---|---|
| HIGH-ORDER 6bit OF INPUT (ADDRESS OF RAM) | 000000 | | | | 000001 | | | | | | 111110 | | | | 111111 | | | |
| LOW-ORDER 2bit OF INPUT | 00 | 01 | 10 | 11 | 00 | 01 | 10 | 11 | 00 | | 00 | 01 | 10 | 11 | 00 | 01 | 10 | 11 |

FIG. 8A

| ADDRESS | RAM1-1 |
|---|---|
| 000000 | OUTPUT FOR INPUT 0 |
| 000001 | OUTPUT FOR INPUT 4 |
| ⋮ | ⋮ |
| 111110 | OUTPUT FOR INPUT 248 |
| 111111 | OUTPUT FOR INPUT 252 |

F I G. 8 B

| アドレス | RAM1-2 |
|---|---|
| 000000 | OUTPUT FOR INPUT 2 |
| 000001 | OUTPUT FOR INPUT 6 |
| ⋮ | ⋮ |
| 111110 | OUTPUT FOR INPUT 250 |
| 111111 | OUTPUT FOR INPUT 254 |

F I G. 8 C

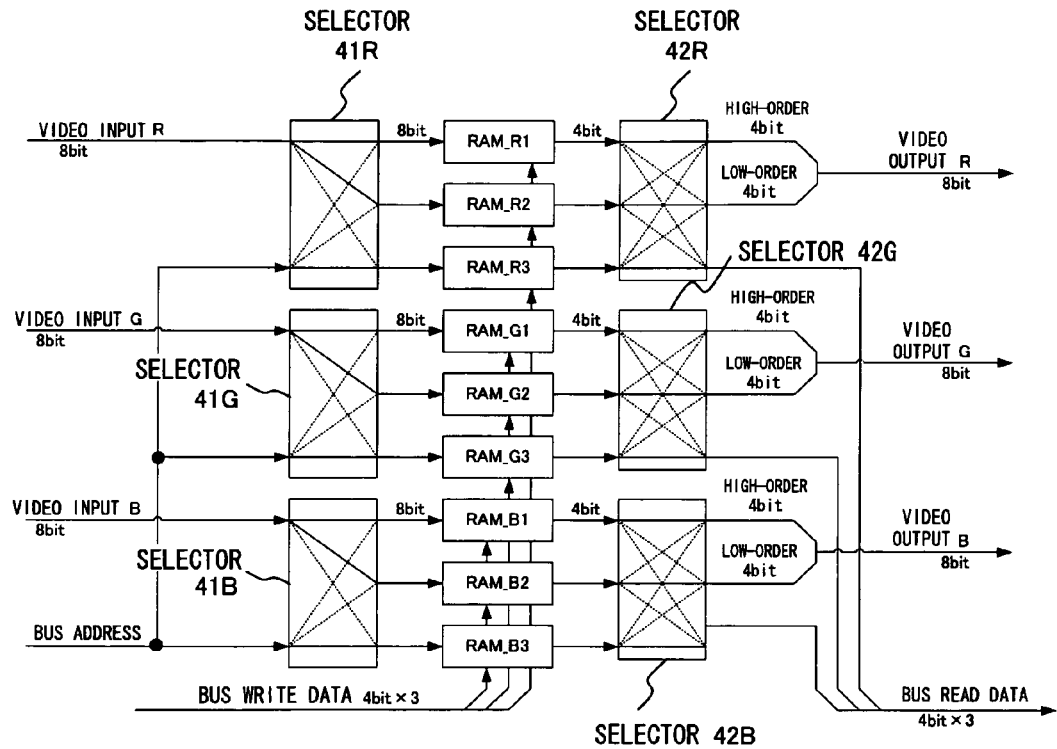
F I G. 9

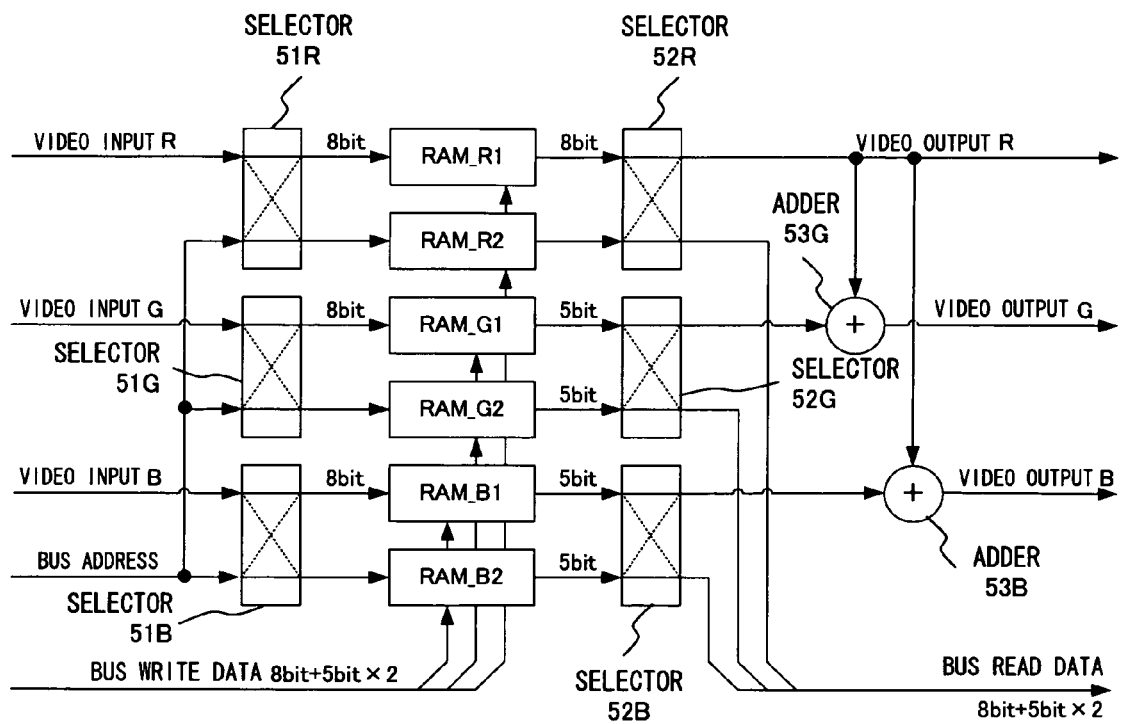
F I G. 10

COLOR SIGNAL ADJUSTMENT MODULE IN IMAGE DISPLAY APPARATUS

CROSS REFERENCE TO RELATED APPLICATIONS

This application is based upon and claims the benefit of priority from the prior Japanese Patent Application No. 2006-81692, filed Mar. 23, 2006, the entire contents of which are incorporated by reference.

BACKGROUND OF THE INVENTION

1. Field of the Invention

The present invention relates to an image processing technique, and more particularly, to a technique for adjusting an image displayed on a display device.

2. Description of the Related Art

When moving image data, for which data compression according to an MPEG (Moving Picture Experts Group) format is performed, is decoded and displayed on a flat panel such as an LCD (Liquid Crystal Display) panel, a PDP (Plasma Display Panel), etc., a phenomenon that a display image becomes too dark or too bright sometimes occurs. This is because the color reproduction range of the panel is not sufficient. To prevent such a phenomenon, data representing the luminance gradation level of each of RGB colors (hereinafter referred to as gradation level data), which are the primary colors of light emission of the flat panel, is sometimes corrected.

Additionally, the light emission characteristics of RGB colors are not uniform on such a flat panel in some cases. For example, even if RGB colors are set as data having the same value, a proper white or gray color is not displayed and tinted blue or red in some cases. To prevent such a phenomenon, for example, as indicated by a graph in FIG. 1, γ (gamma) correction for gradation level data is sometimes made for respective RGB colors.

As one of such techniques for correcting gradation level data, a conversion process for gradation level data by using a lookup table is known. With this technique, a table of gradation level data after being converted, which is made to correspond uniquely to gradation level data before being converted, is stored in a memory such as ROM, RAM, etc., and conversion results of gradation level data are obtained by referencing this table. Here, a technique for making a correspondence between gradation level data before being converted and gradation level data after being converted by using a relationship between an address and a storage area in a memory is widely known.

As the conversion technique for image data by using a lookup table, for example, Japanese Patent Publication No. 2004-38693 discloses a technique for performing an interpolation operation by using lattice point data, which is represented as coordinates of three-dimensional space and read from a lookup table, and coefficient data calculated from γ correction data, according to the γ correction data read in accordance with input data, and for obtaining color conversion data.

Additionally, for example, Japanese Patent Publication No. HEI6-348829 discloses a technique for converting color image data in YUV or YIQ format into image data in RGB format by using a lookup table.

Furthermore, for example, Japanese Patent Publication No. 2002-152545 discloses a technique for expanding input image information into bitmap image data, and for outputting the image data by using a color processing condition corresponding to each type of an image outputting device. This technique discloses that γ correction is made by using a lookup table.

In the meantime, with the above described image display on a flat panel, a correction process for gradation level data according to a moving image to be displayed is performed in some cases. Examples of such a correction process include a correction process for enlarging the gradation level of a black level if the number of relatively dark scenes is large, or for enlarging the gradation level of a white level if the number of relatively bright scenes is large.

Besides, it is sometimes desired that a user can freely change a correction amount to some extent without fixing the correction amount also in the above described γ correction.

In an image processing apparatus for correcting gradation level data by using a lookup table, such a change in a correction amount can be made by altering the contents of the lookup table. However, abortion of an image display is not generally permitted when the correction amount is changed for the above described purpose.

Here, FIG. 2 is explained. This figure shows one example of a configuration of a color adjusting unit in a conventional image processing apparatus. This color adjusting unit is intended to correct gradation level data of respective colors of an input video signal in RGB format by using a lookup table, and to output the data, and is configured to change the contents of the lookup table without aborting the output of the video signal.

In FIG. 2, selectors 100R, 100G, 100B, 101R, 101G, and 101B respectively have a configuration of two inputs and two outputs, and can switch a correspondence between an input and an output according to a controlling device not shown.

RAM_R1, RAM_R2, RAM_G1, RAM_G2, RAM_B1, and RAM_B2 are memories respectively having a storage capacity which can store a lookup table for one color, which is configured by gradation level data after being corrected for each of RGB colors. Here, each gradation level data is assumed to be 256 gradation levels (8 bits), and a memory configured by 8 bits×256 words is used as these memories.

Operations of the color adjusting unit shown in FIG. 2 are described. These operations are similar for the respective R (red), G (green), and B (blue) colors. Therefore, only the operations for R color are described here.

Gradation level data (video input R) input to this color adjusting unit passes through the selector 100R, and is fed to the RAM_R1 as an address. Then, gradation level data to which the input gradation level data is corrected is read from the RAM_R1. The gradation level data after being corrected passes trough the selector 101R, and is output as a video output R.

While the above described color adjustment is being made, an address (BUS address) output from the controlling device not shown passes through the selector 100R, and is fed to the RAM-R2. At the same time, data (BUS write data) output from the controlling device is written to the storage area corresponding to the address in the RAM_R2. Accordingly, the controlling device sequentially feeds the gradation level data before and after being corrected to the RAM_R2 respectively in correspondence with the address and the write data, whereby a lookup table for correcting the gradation level data is newly written to the RAM_R2.

At this time, data read from the RAM_R2 passes through the selector 101R and is transmitted to the controlling device. The controlling device can check the data write to the RAM_R2 by reading this data (BUS read data).

When a change in the correction amount of gradation level data is made, the controlling device simultaneously switches the selectors 100R and 101R. As a result, the gradation level data (video input R) input to the color adjusting unit passes through the selector 100R, and is fed to the RAM_R2 as an address. Then, gradation level data to which the input gradation level data is corrected is read from the RAM_R2. The gradation level data after being corrected passes through the selector 101R, and is output as the video output R. Accordingly, if different lookup tables are stored in the RAM_R1 and the RAM_R2, the gradation level data after being corrected becomes different before and after this switching. Moreover, the video output R is not aborted at the time of this switching.

While the above described color adjustment is being made, the address (BUS address) output from the controlling device passes through the selector 100R and is fed to the RAM_R1 at this time. At the same time, data (BUS write data) output from the controlling device is written to the storage area corresponding to the address in the RAM_R1. Accordingly, the lookup table stored in the RAM_R1 can be rewritten at this time.

As described above, 2 storage areas for lookup tables are prepared in the color adjusting unit shown in FIG. 2 for each color. Accordingly, a lookup table stored in one area can be rewritten while a lookup table stored in the other area is being used to correct gradation level data. Therefore, the contents of the lookup table can be changed without aborting a video signal output, whereby the correction amount of gradation level data can be changed without aborting an image display.

However, a large memory capacity is required to adopt, as the color adjusting unit, the configuration shown in FIG. 2, namely, the configuration where 2 storage areas for lookup tables are prepared for each of the colors.

In the example shown in FIG. 2, the memory capacity required to store the lookup tables in 2 areas for respective RGB colors is 8 bits×256 words×3 colors×2 areas=12288 bits. For example, if the color adjusting unit is configured as an integrated circuit, a wide chip space is required to build a memory of such a large capacity.

A technique for using a dual-port memory to/from which data can be written/read in parallel, and for securing 2 storage areas for lookup tables for each color is considered to reduce the memory capacity of the color adjusting unit. However, since the chip space of the dual-port memory is far beyond double of 1-port memory, the chip space required when the color adjusting unit is mounted in an integrated circuit increases on the contrary.

SUMMARY OF THE INVENTION

It is an object of the present invention to enable the correction amount of gradation level data to be changed without aborting an image output with a small memory capacity.

An image processing apparatus in a first aspect of the present invention comprises: a storing unit comprising storage areas for storing four types of correction data tables for each color, which is configured by data to which gradation level data of a color is corrected; a selecting unit for selecting three types of correction data tables, from which correction data for gradation level data of respective three primary colors of a color image are to be obtained, from among the correction data tables stored in the storing unit; an outputting unit for obtaining the correction data for the gradation level data of the respective three primary colors from the correction data tables selected by the selecting unit, and for outputting the correction data; and a storage controlling unit for making a storage area other than areas, which store the correction data tables selected by the selecting unit, among the storage areas comprised by the storing unit store a correction data table after being changed, which is configured by data to which the correction data is changed.

With this configuration, a storage area used to enable correction data to be changed without aborting an image output is shared by the three primary colors of a color image, thereby reducing a memory capacity.

The above described image processing apparatus according to the present invention can be configured so that the storage controlling unit makes the storing unit store a correction data table after being changed for any one of the three primary colors, and the selecting unit switches the selection of a correction data table for the one color to a correction data table after being changed when the storage controlling unit makes the storing unit store the correction data table after being changed.

With this configuration, a change in correction data can be suitably made.

Additionally, the above described image processing apparatus according to the present invention may further comprise a correction data generating unit for generating correction data, which is not presented by a correction data table, among the correction data for the gradation level data based on correction data of other gradation level data, which are presented by the correction data table.

With this configuration, correction data, which is not presented by a correction data table, is generated by the correction data generating unit, thereby further reducing the memory capacity required to store the correction data table.

At this time, the correction data generating unit can be configured to generate correction data for gradation level data before being corrected by linearly interpolating two correction data respectively presented by the correction data table for the two gradation level data that represent gradation levels contiguous to the gradation level data after being corrected.

With this configuration, correction data, which is not presented by the correction data table, can be suitably generated.

An image processing apparatus in another aspect of the present invention is characterized in comprising: a storing unit comprising storage areas for storing a first correction data table configured by a high-order bit string when a bit string of data to which gradation level data of a color is corrected is partitioned into two bit strings such as the high-order bit string and a low-order bit string, a second correction data table configured by the low-order bit string when the bit string is partitioned into the two bit strings, and a third correction data table configured by changing configuration data of one of the first and the second correction data tables; a selecting unit for selecting two correction data tables, from which correction data for gradation level data of the respective three primary colors of a color image are to be obtained, from among the first, the second, and the third correction data tables stored in the storing unit; and an outputting unit for obtaining the correction data for the gradation level data of the respective three primary colors from the correction data tables selected by the selecting unit, and for outputting the correction data.

With this configuration, a change in correction data is made by partitioning the correction data into high-order and low-order bits, thereby reducing a memory capacity for storage areas required to change the correction data without aborting an image output.

The above described image processing apparatus according to the present invention can be configured so that the selecting unit selects the third and the second correction data tables when the third correction data table configured by changing the configuration data of the first correction data table is stored in the storing unit, or selects the third and the first correction data tables when the third correction data table configured by changing the configuration data of the second correction data table is stored in the storing unit.

With this configuration, a change in correction data is suitably made.

At this time, the image processing apparatus can further comprise a storage controlling unit for making the storing unit store the third correction data table configured by changing the configuration data of the first correction data table, and for making the storing unit store the third correction data table configured by changing the configuration data of the second correction data table when the selecting unit selects the third and the second correction data tables.

With this configuration, a change in correction data is suitably made.

Additionally, at this time, the numbers of digits of the high-order and low-order bit strings can be made identical.

With this configuration, the memory capacity for storage areas can be significantly reduced.

An image processing apparatus in a further aspect of the present invention is characterized in comprising: a storing unit comprising storage areas for storing a first correction data table configured by correction data for gradation level data of any one of three primary colors of a color image, a first changed correction data table configured by changing configuration data of the first correction data table, second and third correction data tables, which are respectively configured by difference value data indicating a difference value between the configuration data and correction data for the gradation level data of each of the other two colors among the three primary colors, and second and third changed correction data tables respectively configured by changing each configuration data of the second and the third correction data tables; a selecting unit for selecting one of a combination of the first, the second, and the third correction data tables, and a combination of the first, the second, and the third changed correction data tables among the correction data tables stored in the storing unit; and an outputting unit for generating correction data for gradation level data of the respective three primary colors based on the correction data tables selected by the selecting unit, and for outputting the correction data.

With this configuration, correction data of other two colors of the three primary colors of a color image are stored in storage areas as difference value data for correction data of one color, whereby the memory capacity for the storage areas required to change the correction data can be reduced without aborting an image output.

The above described image processing apparatus according to the present invention can be configured so that the outputting unit respectively generates correction data for gradation level data of other two colors based on correction data for gradation level data of one color, and difference value data of the other two colors among data obtained from the correction data tables selected by the selecting unit.

With this configuration, correction data of other two colors among the three primary colors of a color image can be suitably generated.

According to the present invention, the image processing apparatuses are configured as described above, thereby producing an effect that a correction amount for gradation level data can be changed without aborting an image output with a small memory capacity.

BRIEF DESCRIPTION OF THE DRAWINGS

The present invention will be more apparent from the following detailed description when the accompanying drawings are referenced.

FIG. 4 shows a first example of a configuration of a color adjusting unit in the image processing apparatus shown in FIG. 3;

FIG. 5 shows a second example of the configuration of the color adjusting unit in the image processing apparatus shown in FIG. 3;

FIG. 7 shows a configuration of the correction data generating unit shown in FIG. 5;

FIG. 8A shows a relationship among a gradation level represented by gradation level data, high-order 6 bits and low-order 2 bits of the gradation level data;

FIG. 8B shows a memory map of RAM 1-1 in FIG. 7;

FIG. 8C shows a memory map of RAM 1-2 in FIG. 7;

FIG. 9 shows a third example of the configuration of the color adjusting unit in the image processing apparatus shown in FIG. 3; and FIG. 10 shows a fourth example of the configuration of the color adjusting unit in the image processing apparatus shown in FIG. 3.

DESCRIPTION OF THE PREFERRED EMBODIMENTS

Preferred embodiments according to the present invention are hereinafter described with reference to the drawings.

Figure 3:
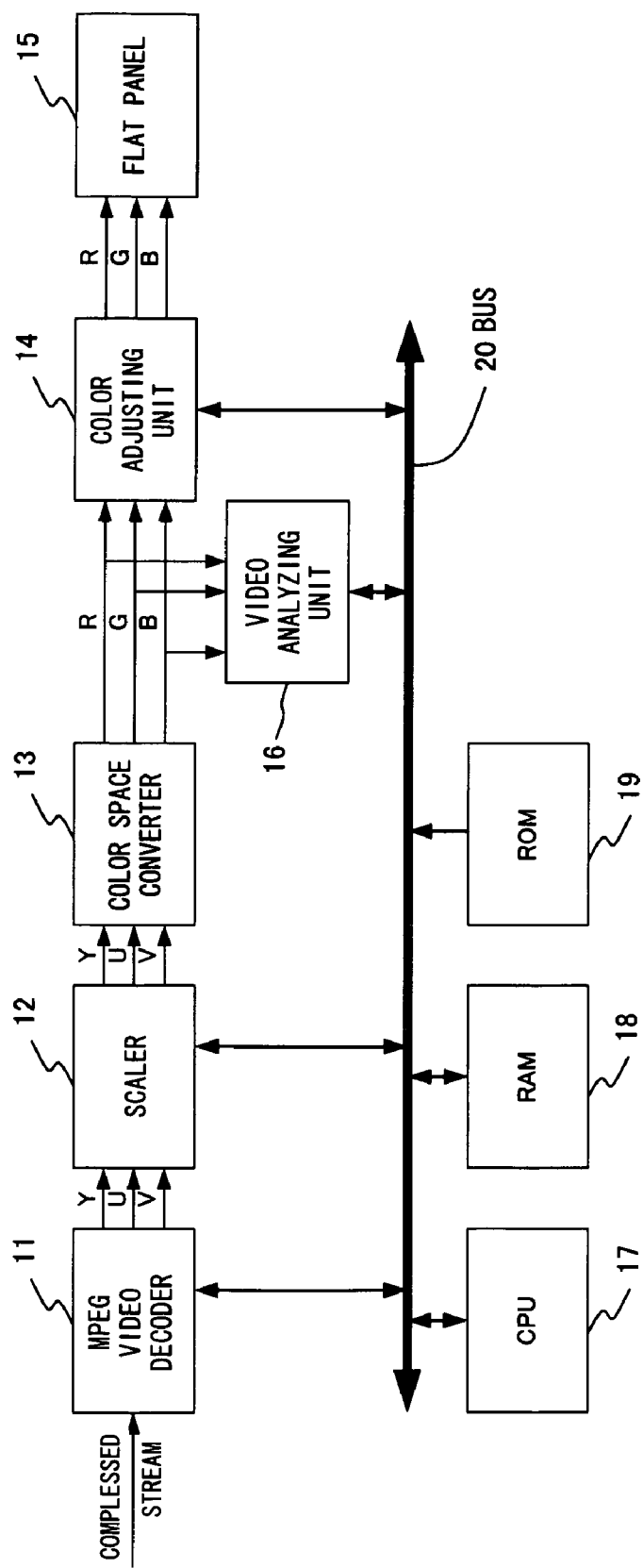
FIG. 3 shows a configuration of an image processing apparatus implementing the present invention.

FIG. 3 is first explained. This figure shows a configuration of an image processing apparatus implementing the present invention. This image processing apparatus is an apparatus for decoding moving image data, for which data compression according to an MPEG format is performed, and for displaying the moving image on a flat panel.

In FIG. 3, an MPEG video decoder 11 decodes a compressed video stream, which is the above described moving image data, and outputs a video signal in YUV format to a scaler 12. The scaler 12 converts the screen size of the moving image represented by the input video signal into a size suitable for a flat panel 15, and outputs the video signal to a color space converter 13. The color space converter 13 converts the video signal in YUV format into a signal in RGB format corresponding to the primary colors of light emission of the flat panel 15.

The following description assumes that the video signal output from the color space converter 13 is gradation level data of 256 levels (8 bits) for all of RGB colors.

A color adjusting unit 14 adjusts the colors of the moving image by correcting the γ characteristic of each of the colors of the video signal converted into RGB format. Additionally, the color adjusting unit 14 changes a correction amount for the γ characteristic of each of the colors according to an instruction from a CPU 17. The flat panel 15 is, for example, an LCD panel or a PDP, and displays the moving image represented by the video signal after its colors are adjusted.

A video analyzing unit 16 analyzes the video signal converted into RGB format, and generates a histogram of luminance.

The CPU 17 is a central processing unit which controls the operations of the entire image processing apparatus, and can transmit/receive various types of data to/from the MPEG video decoder 11, the scaler 12, the color adjusting unit 14, a RAM 18, and a ROM 19 via a bus 20.

The RAM 18 is a random access memory used as a working storage area on demand when the CPU 17 executes a control program. The ROM 19 is a read-only memory which prestores the control program executed by the CPU 17, and various types of data.

The CPU 17 can control the operations of the entire image processing apparatus by executing the control program stored in the ROM 19. With a control for the color adjusting unit 14, which is one of the controls performed by the CPU 17, a correction amount of the γ correction of a video signal, which is made by the color adjusting unit 14, is set and changed based on the light emission characteristics of the flat panel 15, which are prestored in the ROM 19 as data, the luminance distribution of a scene of a moving image to be displayed, which is proved from the histogram output from the video analyzing unit 16, and a γ correction instruction which is desired and issued from a user via an instructing unit not shown.

FIG. 4 is explained next. This figure shows a first example of a configuration of the color adjusting unit 14 in the image processing apparatus shown in FIG. 3.

In FIG. 4, both of selectors 21 and 22 have a configuration of four inputs and four outputs, and can switch a correspondence between an input and an output according to an instruction from the CPU 17.

RAM 1, RAM 2, RAM 3, and RAM 4 are memories respectively having a storage capacity which can store a lookup table (correction data table) for one color, which is configured by gradation level data (correction data) after γ correction is made for each of RGB colors, which are the three primary colors of a color image displayed on the flat panel 15. As these memories, a memory configured by 8 bits×256 words is used.

Operations of the color adjusting unit 14 shown in FIG. 4 are explained.

Firstly, as an initial process, the CPU 17 makes the RAM 1, the RAM 2, and the RAM 3 respectively store a correction data table for R color, a correction data table for G color, and a correction data table for B color. Then, the CPU 17 switches the selector 21 to respectively feed the gradation level data of video inputs R, G, and B to the RAM 1, the RAM 2, and the RAM 3 as an address. At the same time, the CPU 17 switches the selector 22 so that correction data respectively read from the RAM 1, the RAM 2, and the RAM 3 become video outputs R, G, and B.

In this way, a correction data table, from which correction data for gradation level data of each of RGB colors is to be obtained, is suitably selected by the selector 21 for each of the colors from among the correction data tables stored in the respective memories, and suitable correction data for the gradation level data of each of the colors is obtained from the selected correction data table, and output from the selector 22.

A change in the correction amount of the γ correction in the color adjusting unit 14 shown in FIG. 4 is made as follows.

Firstly, the CPU 17 feeds an address (BUS address) to the RAM 4 via the selector 21, and writes data (BUS write data) to the storage area corresponding to the address in the RAM 4. At this time, the CPU 17 sequentially feeds gradation level data before and after being corrected for all of gradation levels of R color to the RAM 4 respectively in correspondence with the address and the write data. In this way, the lookup table (correction data table after being changed) for R color, which is configured by the correction data after being changed, is written to the RAM 4, which is not selected by the selector 21 as a RAM from which correction data is to be obtained.

After terminating this write, the CPU 17 may read the correction data after being changed from the RAM 4 via the selector 22, and may verify whether the read data (BUS read data) and the data written to the RAM 4 match.

After terminating the write of the correction data table after being changed for R color to the RAM 4, the CPU 17 switches the selector 21 to feed the gradation level data of the video inputs R, G, and B respectively to the RAM 4, the RAM 2, and the RAM 3 as an address. At the same time, the CPU 17 switches the selector 22 so that correction data respectively read from the RAM 4, the RAM 2, and the RAM 3 become the video outputs R, G, and B respectively.

The CPU 17 switches the selection of the correction data table for R color, which is made by the selector 21, to the correction data table after being changed when the CPU 17 makes the RAM 4 store the correction data table after being changed for R color. As a result, a change in the correction amount of the γ correction for R color is first complete. Note that the video outputs R, G, and B are not aborted at this time.

Next, the CPU 17 writes a correction data table after being changed for G color to the RAM 1, which is not selected by the selector 21 as a RAM from which correction data is to be obtained. Procedures of this write are similar to the above described procedures of the write of the correction data table after being changed for R color to the RAM 4.

After terminating the write of the correction data table after being changed for G color to the RAM 1, the CPU 17 switches the selector 21 to feed the gradation level data of the video inputs R, G, and B respectively to the RAM 4, the RAM 1, and the RAM 3 as an address. At the same time, the CPU 17 switches the selector 22 so that correction data respectively read from the RAM 4, the RAM 1, and the RAM 3 become the video outputs R, G, and B respectively. Up to this point, also a change in the correction amount of the γ correction for G color is complete. Note that the video outputs R, G, and B are not aborted also at this time.

Next, the CPU 17 writes a correction data table after being changed for B color to the RAM 2, which is not selected by the selector 21 as a RAM from which correction data is to be obtained. Also the procedures of this write are similar to the above described procedures of the write of the correction data table after being changed for R color to the RAM 4.

After terminating the write of the correction data table after being changed for B color, the CPU 17 switches the selector 21 to feed the gradation level data of the video inputs R, G, and B respectively to the RAM 4, the RAM 1, and the RAM 2 as an address. At the same time, the CPU 17 switches the selector 22 so that correction data respectively read from the RAM 4, the RAM 1, and the RAM 2 become the video outputs R, G, and B respectively. Up to this point, changes in the correction amounts of the γ correction for all of RGB colors are complete. Note that the video outputs R, G, and B are not aborted also at this time.

Figure 1:
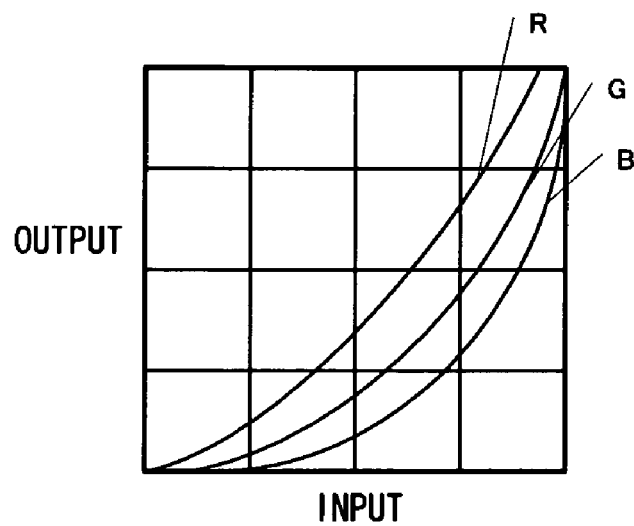
FIG. 1 shows an example of γ correction of gradation level data.
Figure 2:
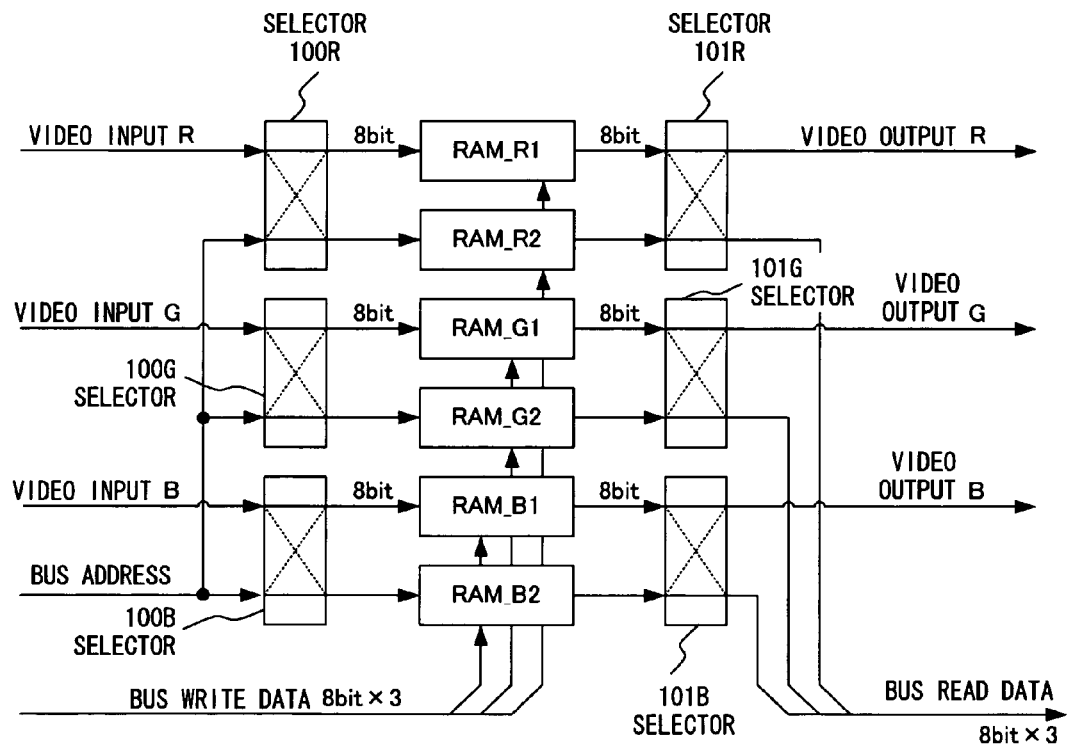
FIG. 2 shows one example of a configuration of a color adjusting unit in a conventional image processing apparatus.

A total of the memory capacity required in the configuration of the color adjusting unit 14 shown in FIG. 4 is 8 bits×256 words×4 areas=8192 bits. Accordingly, the memory capacity is proved to decrease in comparison with the conventional configuration shown in FIG. 2.

In the above provided explanation, the changes in the correction amounts of the γ correction are made in an order of R, G, and B colors. However, the order of these changes is arbitrary.

FIG. 5 is explained next. This figure shows a second example of the configuration of the color adjusting unit 14 in the image processing apparatus shown in FIG. 3. The same constituent elements as those shown in FIG. 4 are denoted with the same reference numerals in FIG. 5.

The second example shown in FIG. 5 is different from the first example shown in FIG. 4 in a point that the RAM 1, the RAM 2, the RAM 3, and the RAM 4, which are shown in FIG. 4, are respectively replaced with correction data generating units 23-1, 23-2, 23-3, and 23-4.

The correction data generating units 23-1, 23-2, 23-3, and 23-4 obtain correction data from a correction data table for gradation level data correction data of which is presented by a correction data table stored in a RAM comprised by the units themselves among the gradation level data of the video inputs R, G, and B fed by the selector 21, and outputs the correction data. In the meantime, for gradation level data correction data of which is not presented by the correction data table, the correction data generating units 23-1, 23-2, 23-3, and 23-4 generate correction data based on correction data for other gradation level data presented by the correction data table.

The principle of generation of correction data made by the correction data generating units 23-1, 23-2, 23-3, and 23-4 is described with reference to FIG. 6.

Figure 6:
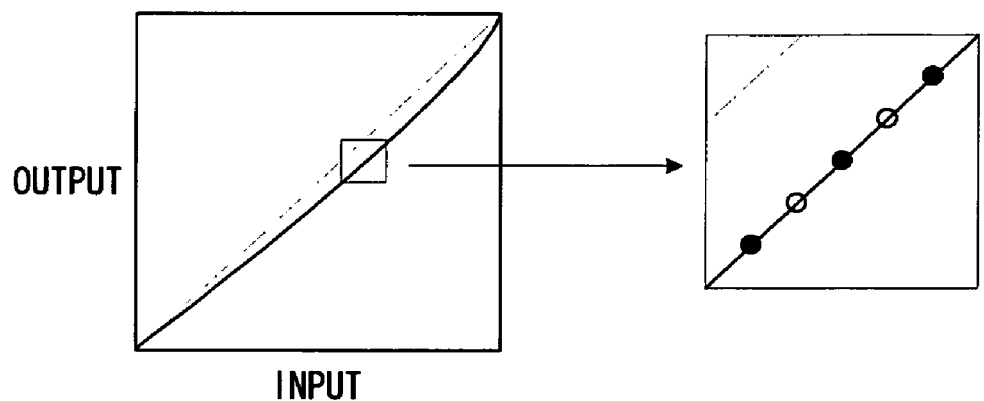
FIG. 6 explains the principle of generation of correction data made by a correction data generating unit.

A curve on the left side in FIG. 6 shows one example of a relationship between gradation level data before and after the γ correction. A schematic on the right side in this figure is an enlarged portion of the curve. If the curve that represents the correction characteristic of the γ correction is observed in minute sections, it can be regarded as a straight line as indicated by this schematic.

Accordingly, the correction data generating units 23-1, 23-2, 23-3, and 23-4 respectively store in RAMs of themselves a correction data table configured only by correction data at black circle points shown in the schematic on the right side, namely, only correction data for gradation level data every two levels. In the meantime, the correction data generating units 23-1, 23-2, 23-3, and 23-4 generate correction data for gradation level data at a white circle point shown in the schematic on the right side by linearly interpolating two correction data respectively presented by the correction data table for gradation level data at two black circle points representing gradation levels which are contiguously higher and lower levels of the gradation level data.

In this way, the memory capacity required to store the correction data tables in the color adjusting unit 14 can be halved in comparison with the memory capacity required in the first example shown in FIG. 5.

FIG. 7 is explained next. This figure shows the configuration of the correction data generating unit 23-1 shown in FIG. 5. Since all of the correction data generating units 23-1, 23-2, 23-3, and 23-4 have the same configuration, only the configuration of the correction data generating unit 23-1 is explained here.

An address generating unit 31 generates a 6-bit address to be fed to the RAM 1-1 and the RAM 1-2 based on the respective data of high-order 6 bits and low-order 2 bits of the gradation level data (8-bit data) of the video input R.

In the RAM 1-1 and the RAM 1-2, a correction data table for R color, which is configured only by correction data for gradation level data every 2 levels, is shared and stored as will be described later. As both of these memories, a memory configured by 8 bits×64 words is used.

An adder 32 adds correction data respectively read from the RAM 1-1 and the RAM 1-2 according to the address fed from the address generating unit 31.

A shifter 33 outputs a value of one half of an addition result by shifting the addition result of the correction data, which is output from the adder 32, to the right (lower-order digit) by one bit.

A register 34 holds correction data for predetermined gradation level data to be described later.

A delay unit 35 delays the gradation level data of the video input R, and makes the correspondence between the gradation level data and its correction data in a selector 36 suitable.

The selector 36 has a configuration of four inputs and one output. The selector 36 selects any of 4 input correction data based on the gradation level data transmitted from the delay unit 35, and outputs the selected correction data as the video output R.

Operations of the units of the correction data generating unit 23-1, the configuration of which is shown in FIG. 7, are described with reference to FIGS. 8A, 8B, and 8C.

FIG. 8A shows a relationship between a gradation value represented by the gradation level data of the video input R, high-order 6 bits and low-order 2 bits of the gradation level data. FIG. 8B shows a memory map of the RAM 1-1, and FIG. 8C shows a memory map of the RAM 1-2.

As shown in FIG. 8B, in the RAM 1-1, a correction data table, which is configured by correction data when the value of the gradation level data before being corrected is "0" (=4×0), "4" (=4×1), "8" (=4×2), . . . , "252" (=4×63), is stored in a storage area corresponding to the respective binary addresses "000000" to "111111". Additionally, as shown in FIG. 8C, in the RAM 1-2, a correction data table, which is configured by correction data when the value of the gradation level data before being corrected is "2" (=4×0+2), "6" (=4×1+2), "10" (=4×2+2) . . . , "254" (=4×63+2), is stored in a storage area corresponding to the respective binary addresses "000000" to "111111".

The register 34 is made to hold the correction data when the value of the gradation level data before being corrected is "255". This enables correction data to be obtained without being generated with linear interpolation, since the correction data when the gradation level data is the next value ("256") is stored neither in the RAM 1-1 nor the RAM 1-2.

The address generating unit 31 uses the high-order 6 bits of gradation level data as an address to be fed to the RAM 1-1 if the low-order 2 bits of the gradation level data is any of "00", "01", and "10" according to the gradation level data input to the correction data generating unit 23-1. If the low-order 2 bits of the gradation level data is "11", a value obtained by adding "1" to the high-order 6 bits of the gradation level data is used as an address to be fed to the RAM 1-1. In the meantime, the value of the high-order 6 bits of the gradation level data is used as an address to be fed to the RAM 1-2 in all cases.

A selector 36 selects and outputs correction data as follows according to the gradation level data, which is input to the correction data generating unit 23-1 and to which a suitable delay is given by the delay unit 35.

If the gradation level data is "255", the selector 36 selects and outputs correction data at "d" in FIG. 7, namely, the correction data held by the register 34. If the gradation level data is not "255", the selector 36 selects and outputs correction data as follows according to the value of the low-order 2 bits of the gradation level data.

Firstly, if the low-order 2 bits of the gradation level data is "00", the selector 36 selects and outputs correction data at "a" in FIG. 7, namely, data read by feeding the high-order 6 bits of the gradation level data to the RAM 1-1 as an address.

If the low-order 2 bits of the gradation level data is "01", the selector 36 selects and outputs correction data at "b" in FIG.

7, namely, correction data obtained by adding and averaging two correction data read by respectively feeding the high-order 6 bits of the gradation level data to the RAM 1-1 and the RAM 1-2 as an address.

Or, if the low-order 2 bits of the gradation level data is "10", the selector 36 selects and outputs data at "c" in FIG. 7, namely, data read by feeding the high-order 6 bits of the gradation level data to the RAM 1-2 as an address.

If the low-order 2 bits of the gradation level data is "11", the selector 36 selects and outputs correction data at "b" in FIG. 7, namely, correction data obtained by adding and averaging the correction data read by feeding the value obtained by adding "1" to the high-order 6 bits of the gradation level data to the RAM 1-1 as an address, and the correction data read by feeding the high-order 6 bits of the gradation level data to the RAM 1-2.

The units configuring the correction data generating unit 23-1 operate as described above. Accordingly, the correction data generating unit 23-1 operates as follows.

For example, a case where "00000001" (gradation level is "1") is input to the correction data generating unit 23-1 as gradation level data is considered. In this case, the low-order 2 bits of the gradation level data are "01". Therefore, the address generating unit 31 feeds "000000", which is the high-order 6 bits of the gradation level data, to the RAM 1-1 and the RAM 1-2 as an address, and the selector 36 selects and outputs the correction data at "b" in FIG. 7, namely, the correction data obtained by adding and averaging two correction data respectively read from the RAM 1-1 and the RAM 1-2 at this time.

Additionally, for example, a case where "11111011" (gradation level is "251") is input to the correction data generating unit 23-1 as gradation level data is considered. In this case, the low-order 2 bits of the gradation level data are "11". Therefore, the address generating unit 31 feeds a value "111111", which is obtained by adding "1" to the high-order 6 bits of the gradation level data, to the RAM 1-1 as an address, and also feeds "111110", which is the high-order 6 bits of the gradation level data, to the RAM 1-2 as an address. In this case, the selector 36 selects and outputs the correction data at "b" in FIG. 7, namely, the correction data obtained by adding and averaging the 2 correction data respectively read from the RAM 1-1 and the RAM 1-2 at this time.

The correction data generating unit 23-1 operates as described above, thereby linearly interpolating two correction data respectively presented by a correction data table for two gradation level data, which represent gradation levels contiguous to the gradation level data before being corrected, for correction data to be generated. In this way, correction data, which is not presented by the correction data tables stored in both of the RAM 1-1 and the RAM 1-2, is generated, whereby the memory capacity comprised by the color adjusting unit 14 can be further reduced in comparison with the configuration shown in FIG. 4.

Procedures of a change in the correction amount of the γ correction in the color adjusting unit 14 shown in FIG. 5 are similar to those in the above described first example if the replacement of the RAM 1, the RAM 2, the RAM 3, and the RAM 4, which are shown in FIG. 4, respectively with the correction data generating units 23-1, 23-2, 23-3, and 23-4 is considered.

FIG. 9 is explained next. This figure shows a third example of the configuration of the color adjusting unit 14 in the image processing apparatus shown in FIG. 3.

In the third example, each correction data configuring a correction data table is partitioned into two bit strings, and a correction data table configured by a bit string of the high-order 4 bits of each correction data, and a correction data table configured by a bit string of the low-order 4 bits of each correction data are stored in the storing unit. When the correction data is changed, switching to a correction data table after being changed, which is configured by the bit string of the high-order 4 bits of correction data after being changed, and switching to a correction data table after being changed, which is configured by the bit string of the low-order 4 bits of the correction data after being changed, are separately made.

In FIG. 9, selectors 41R, 41G, and 41B respectively have a configuration of two inputs and three outputs. Additionally, selectors 42R, 42G, and 42B respectively have a configuration of three inputs and three outputs. All of these selectors can switch a correspondence between an input and an output according to an instruction from the CPU 17.

RAM_R1, RAM_R2, RAM_R3, RAM_G1, RAM_G2, RAM_G3, RAM_B1, RAM_B2, and RAM_B3 are memories for storing a correction data table configured by correction data for each of RGB colors. The RAM_R1, the RAM_R2, and the RAM_R3 are intended for R color, the RAM_G1, the RAM_G2, and the RAM_G3 are intended for G color, and the RAM_B1, the RAM_B2, and the RAM_B3 are intended for B color. As these memories, a memory configured by 4 bits×256 words is used. Accordingly, two among these memories must be used to store a correction data table (8 bits×256 words) for one color.

Operations of the color adjusting unit 14 shown in FIG. 9 are described. The operations of this color adjusting unit 14 are performed for the respective RGB colors in parallel.

Since the operations of the color adjusting unit 14 are similar for the respective RGB colors, only the operations for R color are explained here.

Firstly, as an initial process, the CPU 17 partitions each correction data, which configures the correction data table for R color, into two bit strings, and makes the RAM_R1 store a correction data table configured by a bit string of the high-order 4 bits of the data, and also makes the RAM_R2 store a correction data table configured by a bit string of the low-order 4 bits of the data. Then, the CPU 17 switches the selector 41R to feed the gradation level data of the video input R respectively to the RAM_R1 and the RAM_R2 as an address, and also switches the selector 42R to generate the video output R from correction data respectively read from the RAM_R1 and the RAM_R2 at this time. Then, the bit string (string read from the RAM_R1) of the high-order 4 bits and the bit string (string read from the RAM_R2) of the low-order 4 bits, which passed through the selector 42R, are combined and output as the video output R.

In this way, two correction data tables, from which the correction data for the gradation level data of R color is to be obtained, are suitably selected by the selector 41R from among the correction data tables stored in the respective memories, and the correction data for the gradation level data of each of the three primary colors are obtained and output from the selector 42R.

A change in the correction amount of the γ correction in the color adjusting unit 14 shown in FIG. 9 is made as follows. Also the operations of this change are performed for the respective RGB colors in parallel.

Also the operations of the change performed by the color adjusting unit 14 are similar for all of the RGB colors. Therefore, only the operations for R color are explained here.

Firstly, the CPU 17 feeds an address (BUS address) to the RAM_R3 via the selector 41R, and writes data (BUS write data) to the storage area corresponding to the address in the RAM_R3. At this time, the CPU 17 sequentially feeds gradation level data before being corrected for all of gradation levels of R color, and the high-order 4 bits of correction data after being changed to the RAM_R3 respectively in correspondence with the address and the write data. In this way, a correction data table after being changed for R color, which is configured by the bit string of the high-order 4 bits of the correction data after being changed, is written to the RAM_R3, which is not selected by the selector 41R as a RAM from which the correction data is to be obtained.

After terminating this write, the CPU 17 may read the correction data after being changed via the selector 42B, and may verify whether or not the read data (BUS read data) and the data written to the RAM_R3 match.

After terminating the write of the correction data table after being changed for R color to the RAM_R3, the CPU 17 switches the selector 41R to feed the gradation level data of the video input R respectively to the RAM_R3 and the RAM_R2 as an address. At the same time, the CPU 17 switches the selector 42R so that correction data respectively read from the RAM_R3 and the RAM_R2 become the video output R. Then, the bit string (string read from the RAM_R3) of the high-order 4 bits and the bit string (string read from the RAM_R2) of the low-order 4 bits, which passed through the selector 42R, are combined and output as the video output R.

As described above, if the CPU 17 makes the RAM_R3 store the correction data table after being changed, which is configured by changing configuration data (bit string of the high-order 4 bits of the correction data before being changed) of the correction data table stored in the RAM_R1, the CPU 17 switches the selection by the selector 42R to make the selector 42R select a total of two memories such as the RAM_R3 and the RAM_R2 storing the correction data table configured by the bit string of the low-order 4 bits of the correction data after being changed. Note that the video output R is not aborted during this switching.

Next, the CPU 17 writes the correction data table after being changed for R color, which is configured by the bit string of the low-order 4 bits of the correction data after being changed for R color, to the RAM_R1, which is not selected by the selector 41R as a RAM from which correction data is to be obtained. Procedures of this write are similar to the above described procedures of the write of the correction data table after being changed for R color to the RAM_R3. Additionally, after terminating this write, the CPU 17 may read the correction data after being changed from the RAM_R1 via the selector 42B, and may verify whether or not the read data (BUS read data) and the data written to the RAM_R1 match.

After terminating the write of the correction data table after being changed for R color to the RAM_R1, the CPU 17 switches the selector 41R to feed the gradation level data of the video input R respectively to the RAM-R3 and the RAM_R1 as an address, and also switches the selector 42R so that correction data respectively read from the RAM_R3 and the RAM_R1 become the video output R. Then, the bit string (string read from the RAM_R3) of the high-order 4 bits and the bit string (string read from the RAM_R1) of the low-order 4 bits, which passed through the selector 42R, are combined and output as the video output R.

As described above, if the CPU 17 makes the RAM_R1 store the correction data table after being changed, which is configured by changing the configuration data (the bit string of the low-order 4 bits of the correction data before being changed) of the correction data table stored in the RAM_R2, the CPU 17 switches the selection by the selector 42R to make the selector 42R select a total of 2 memories such as the RAM_R1 and the RAM_R3 storing the correction data table configured by the bit string of the high-order 4 bits of the correction data after being changed. Note that the video output R is not aborted during this switching. In this way, a change in the correction amount of the γ correction for R color is complete.

If a change in the correction amount of the γ correction is made hereafter, the correction data table after being changed, which is configured by the bit string of the high-order 4 bits of the correction data after being changed, is written to the RAM_R2, and the correction data table after being changed, which is configured by the bit string of the low-order 4 bits of the correction data after being changed, is written to the RAM_R3. Thereafter, a memory to which the correction data table after being changed is to be written is selected in a cyclic order of the RAM_R1, the RAM_R2, the RAM_R3, the RAM_R1 . . . .

A total of the memory capacity required in the configuration of the color adjusting unit 14 shown in FIG. 9 is 4 bits×256 words×9 areas=9216 bits. Accordingly, the memory capacity is proved to decrease in comparison with the conventional configuration shown in FIG. 2.

FIG. 10 is explained next. This figure shows a fourth example of the configuration of the color adjusting unit 14 in the image processing apparatus shown in FIG. 3.

In the fourth example, attention is paid to the fact that configuration data of correction data tables for the respective RGB colors are not so different with the γ correction made within a range where the image processing apparatus is normally used. Namely, in the fourth example, configuration data of the correction data tables for G and B colors are respectively defined as data of a difference value from the correction data configuring the correction data table for R color, and correction data for G and B colors are generated from the correction data for R color, and the respective difference value data of G and B colors.

In FIG. 10, selectors 51R, 51G, 51B, 52R, 52G, and 52B respectively have a configuration of two inputs and two outputs, and all of these selectors can switch a correspondence between an input and an output according to an instruction from the CPU 17.

RAM_R1, RAM_R2, RAM_G1, RAM_G2, RAM_B1, and RAM_B2 are memories for storing a correction data table configured by correction data for the respective RGB colors. The RAM_R1 and the RAM_R2 are intended for R color, the RAM_G1 and the RAM_G2 are intended for G color, and the RAM_B1 and the RAM_B2 are intended for B color. As the RAM_R1 and the RAM_R2 among these memories, a memory configured by 8 bits×256 words is used. As the other memories, a memory configured by 5 bits×256 words is used in this preferred embodiment.

Adders 53G and 53B add correction data for R color and difference value data for G and B colors, and generate correction data for G and B colors respectively.

Operations of the color adjusting unit 14 shown in FIG. 10 are explained.

Firstly, as an initial process, the CPU 17 makes the RAM_R1, the RAM_G1 and the RAM_B1 respectively store a correction data table for R color, a correction data table for G color, and a correction data table for B color. Note that, however, configuration data of the correction data tables for G and B colors are defined to be data of a difference value from the configuration data of the correction data table for R color. Then, the CPU 17 respectively switches the selectors 51R, 51G, and 51B to feed the gradation level data of the video inputs R, G, and B respectively to the RAM_R1, the RAM_G1, and the RAM_B1 as an address, and also switches the selectors 52R, 52G, and 52B to respectively generate the video outputs R, G, and B from data respectively read from the RAM-R1, the RAM_G1, and the RAM_B1 at this time.

Here, as the video output R, the correction data for R color, which passed through the selector 52R, is output from the color adjusting unit 14 unchanged. In the meantime, as the video outputs G and B, results obtained by performing an addition, in the adders 53G and 53B, of the correction data for R color, which passed through the selector 52R, and the respective difference value data for G and B colors, which passed through the selectors 52G and 52B respectively, are output from the color adjusting unit 14.

As described above, in the configuration shown in FIG. 10, the correction data for the gradation level data of G and B colors are generated and output by adding the correction data for the gradation level data of R color, and the difference value data for the respective G and B colors among data obtained from the three correction data tables stored in the memories selected by the selectors 52R, 52G, and 52B.

A change in the correction amount of the γ correction in the color adjusting unit 14 shown in FIG. 10 is made as follows.

Firstly, the CPU 17 feeds an address (BUS address) to the RAM_R2, the RAM_G2, and the RAM_B2 via the selectors 51R, 51G, and 51B, and writes data (BUS write data) to the storage area corresponding to the address in the RAM_R2, the RAM_G2, and the RAM_B2. At this time, the CPU 17 sequentially feeds gradation level data before being corrected for all of levels of R color and correction data after being changed to the RAM_R2 respectively in correspondence with the address and the write data. Additionally, in parallel with this operation, the CPU 17 sequentially feeds gradation level data before being corrected for all of gradation levels of the respective G and B colors, and the above described difference value data to the RAM_G2 and the RAM_B2 respectively in correspondence with the address and the write data. In this way, the correction data table after being changed for R color is written to the RAM_R2, which is not selected by the selector 51R as a RAM from which correction data is to be obtained, and the correction data tables after being changed, which are configured by the above described difference value data for G and B colors, are respectively written to the RAM_G2 and the RAM_B2, both of which are not selected by the selectors 51G and 51B as RAMs from which correction data is to be obtained.

After terminating this write, the CPU 17 may read the correction data after being changed respectively from the RAM_R2, the RAM_G2, and the RAM_B2 via the selectors 52R, 52G, and 52B, and may verify whether or not the read data (BUS read data) and the data respectively written to the RAM_R2, the RAM_G2, and the RAM_B2 match.

After terminating the write of the correction data table after being changed to the RAM_R2, the RAM_G2, and the RAM_B2, the CPU 17 respectively switches the selectors 51R, 51G, and 51B to feed the gradation level data of the video inputs R, G, and B respectively to the RAM_R2, the RAM_G2, and the RAM_B2 as an address, and also switches the selectors 52R, 52G, and 52B to respectively generate the video outputs R, G, and B from data read respectively from the RAM_R2, the RAM_G2, and the RAM_B2 at this time. Also at this time, as the video output R, the correction data for R color, which passed through the selector 52R, is output from the color adjusting unit 14 unchanged. As the video outputs G and B, results obtained by performing an addition, in the adders 53G and 53B, of the correction data for R color, which passed through the selector 52R, and the difference value data for G and B colors, which passed through the selectors 52G and 52B respectively, are output from the color adjusting unit 14.

In this way, the CPU 17 switches the selection of the correction data table for the respective colors, which is made by the selectors 52R, 52G, and 52B, to correction data tables after being changed when the CPU 17 makes the RAM_R2, the RAM_G2, and the RAM_B2 store the correction data tables after being changed for the respective RGB colors, whereby changes in the correction amounts of the γ correction for all of RGB colors are complete. Note that the video outputs R, G, and B are not aborted at this time.

As described above, the fourth example of the color adjusting unit 14 shown in FIG. 10 comprises memories such as the RAM_R1, the RAM_R2, the RAM_G1, the RAM_G2, the RAM_B1, and the RAM_B2 for respectively storing the correction data table of R color, which is configured by the correction data for the gradation level data of R color, the changed correction data table for R color, which is configured by changing the configuration data of the correction data table for R color, the correction data tables for G and B colors, which are configured by difference value data indicating a difference value between the configuration data and correction data for each gradation level data for G and B colors, and the changed correction data tables for G and B colors, which are respectively configured by changing each configuration data of the correction data tables for G and B colors. Then, the selectors 52R, 52G, and 52B select one of a combination of the correction data tables for R, G, and B colors, and a combination of the changed correction data tables for R, G, and B colors among the correction data tables, and correction data for the gradation level data of the respective RGB colors are generated based on the selected correction data tables, and output.

A total of the memory capacity required in the configuration of the color adjusting unit 14 shown in FIG. 10 is 8 bits×256 words×2 areas+5 bits×256 words×4 areas=9216 bits. Accordingly, the memory capacity is proved to decrease in comparison with the conventional configuration shown in FIG. 2.

In the above provided explanation of the fourth example of the configuration of the color adjusting unit 14, the correction data for respective G and B colors are generated based on the correction data for R color, and the difference value data for G and B colors. Alternatively, correction data for B and R colors may be generated from correction data for G color, and difference value data for B and R colors. Or, correction data for R and B colors may be generated from correction data for B color, and difference value data for R and G colors.

Additionally, in the above provided explanation of the fourth example of the configuration of the color adjusting unit 14, the data length of the difference value data for G and B colors when the correction data for R color is 8 bits is set to 5 bits. However, the data length of difference value data may be increased/decreased according to a difference among correction data of the respective RGB colors.

Up to this point, the preferred embodiments according to the present invention are described. However, the present invention is not limited to the above described preferred embodiments.

For example, the above described preferred embodiments are described by assuming that the plurality of RAMs comprised by the color adjusting unit 14 are physically separate memories. However, for example, if the color adjusting unit 14 is configured as an integrated circuit, these memories can be mounted as different storage areas on the same chip as a matter of course.

Additionally, the technical concept embodied in the first example of the configuration of the color adjusting unit 14 shown in FIG. 4 can be combined with the third example of the configuration of the color adjusting unit 14 shown in FIG. 9. Namely, the color adjusting unit 14 can be configured in a way such that, for a change in a correction data table, the number of RAMs provided for the change is set to one instead of providing a total of three RAMs respectively provided for RGB colors as in the configuration shown in FIG. 9, and this RAM is shared by RGB colors as in the first example.

Furthermore, the technical concept embodied in the first example of the configuration of the color adjusting unit 14 shown in FIG. 4 can be combined with the fourth example of the configuration of the color adjusting unit 14 shown in FIG. 10. Namely, the color adjusting unit 14 can be configured in a way such that, for changes in correction data tables for G and B colors, the number of RAMs provided for the changes is set to one instead of providing a total of two RAMs respectively provided for G and B colors as in the configuration shown in FIG. 10, and this RAM is shared for G and B colors as in the first example.

What is claimed is:

1. An image processing apparatus, comprising:
    a storing unit including storage areas configured to store
        a first correction data table including first correction data for gradation level data of a first primary color,
        a first changed correction data table including first changed correction data obtained by changing the first correction data,
        a second correction data table including first correction data difference between the first correction data and second correction data for gradation level data of a second primary color,
        a third correction data table including second correction data difference between the first correction data and third correction data for gradation level data of a third primary color,
        a second changed correction data table including first changed correction data difference obtained by changing the first correction data difference, and
        a third changed correction data table including second changed correction data difference obtained by changing the second correction data difference;
    a selecting unit configured to select one of a first combination of the first, the second, and the third correction data tables, and a second combination of the first, the second, and the third changed correction data tables;
    an outputting unit configured to generate correction data for the gradation level data of each of the first primary color, the second primary color and the third primary color based on the correction data tables selected by said selecting unit, and configured to output the correction data;
    a first adder configured to add one of the first correction data and the first changed correction data to one of the first correction data difference and the first changed correction data difference; and
    a second adder configured to add one of the first correction data and the first changed correction data to one of the second correction data difference and the second changed correction data difference, wherein
    in response to an input of the gradation level data of the second primary color, the storing unit outputs one of the first correction data difference read from the second correction data table and the first changed correction data difference read from the second changed correction data table, and
    in response to an input of the gradation level data of the third primary color, the storing unit outputs one of the second correction data difference read from the third correction data table and the second changed correction data difference read from the third changed correction data table.

2. The image processing apparatus according to claim 1, wherein
    said outputting unit generates the correction data for the gradation level data of each of the other two colors based on the correction data for the gradation level data of one color, and the difference value data for each of the other two colors among data obtained from the correction data tables selected by said selecting unit.

3. The image processing apparatus according to claim 1, wherein the selecting unit includes a first selector, a second selector and a third selector,
    wherein the first selector selects one of the first correction table and the first changed correction table,
    wherein the second selector selects one of the second correction table and the second changed correction table, and
    wherein the third selector selects one of the third correction table and the third changed correction table.

* * * * *